US006957499B2

(12) United States Patent
Roberts (10) Patent No.: US 6,957,499 B2
(45) Date of Patent: Oct. 25, 2005

(54) DEPTHOMETER

(76) Inventor: Danny Roberts, 1200 Roberts Dr., Bloomfield, NM (US) 87413

( * ) Notice: Subject to any disclaimer, the term of this patent is extended or adjusted under 35 U.S.C. 154(b) by 0 days.

(21) Appl. No.: 10/684,315

(22) Filed: Oct. 11, 2003

(65) Prior Publication Data

US 2005/0076528 A1 Apr. 14, 2005

(51) Int. Cl.[7] .................................................. G01B 3/12
(52) U.S. Cl. ............................. 33/772; 33/735; 33/1 LE
(58) Field of Search ................................ 33/1 LE, 713, 33/719–722, 734, 772, 773, 775, 779, 782, 783, 735, 743, 744, 747–749; 242/563.2

(56) References Cited

U.S. PATENT DOCUMENTS

| 1,044,384 A | * | 11/1912 | Hayden et al. ............... 33/720 |
| 1,164,002 A | | 12/1915 | Jones |
| 1,228,991 A | | 6/1917 | Uber |
| 1,251,152 A | | 12/1917 | Wilkins |
| 1,266,631 A | | 5/1918 | Roy |
| 1,481,980 A | | 1/1924 | Bostic |
| 1,484,036 A | * | 2/1924 | Mason ........................ 33/749 |
| 1,485,096 A | | 2/1924 | Tiller |
| 1,651,643 A | | 12/1927 | St. Clair |
| 1,699,235 A | | 1/1929 | Geis et al. |
| 1,705,553 A | | 3/1929 | Berry |
| 1,969,969 A | | 8/1934 | Dunagin |
| 2,040,522 A | * | 5/1936 | Gulick ........................ 33/719 |
| 2,136,457 A | | 11/1938 | Nixon |
| 2,154,621 A | | 4/1939 | Jenkins |
| 2,269,650 A | * | 1/1942 | Cooney ....................... 33/775 |
| 2,271,742 A | | 2/1942 | McCullough |
| 2,583,841 A | | 1/1952 | Hayward |
| 2,591,615 A | * | 4/1952 | Saff et al. .................... 33/744 |
| 2,876,549 A | | 3/1959 | Adamson et al. |
| 3,318,005 A | * | 5/1967 | Petersen ...................... 33/772 |
| 3,874,108 A | * | 4/1975 | Connor ........................ 33/720 |
| 4,461,015 A | * | 7/1984 | Kulhavy ...................... 33/719 |
| 4,570,348 A | | 2/1986 | Amsler et al. |
| 4,974,327 A | * | 12/1990 | Greenslade .................. 33/783 |
| 5,351,531 A | * | 10/1994 | Kerr ............................ 33/719 |
| 5,383,283 A | * | 1/1995 | Olsen et al. ................. 33/783 |
| 5,503,341 A | * | 4/1996 | Kaneko et al. .............. 33/719 |
| 757,810 A1 | | 4/2004 | Hudson |

* cited by examiner

Primary Examiner—G. Bradley Bennett
(74) Attorney, Agent, or Firm—Mays & Fain, LLP; Andrea L. Mays (57) ABSTRACT

A depthometer for measuring a length of an elongate line. A main wheel is mounted upon a main body component and is in communication with a registering mechanism. Line guides are mounted upon a lower body component. An inner handle connected to the main body component is pulled toward an outer handle connected to the lower body component, in opposition to a spring-like force in the opposite direction, to open the depthometer and position a line within the depthometer. The main body component is automatically moved towards the lower body component via a spring-like force when the inner handle is released, thereby engaging the line in the depthometer in the installed position.

21 Claims, 9 Drawing Sheets

DEPTHOMETER

BACKGROUND OF THE INVENTION

1. Field of the Invention (Technical Field)

The present invention relates generally to the field of instruments used for measuring distances. In particular, the present invention relates to instruments for measuring a length of an elongate line.

2. Background Art

In the well drilling industry cables or wires are lowered into the well for determining well depths. The lack of identifying features on a cable render measurement of the length of cable lowered into the well difficult to determine from the position of the wellhead, or well opening. An early method of measurement commonly referred to as "stringing in" utilized a predefined length of cord to measure the length of cable entering a well, one predefined length at a time, until the desired maximum depth was reached.

Since that time wheeled measuring tools and others, commonly referred to as "depthometers", have replaced the stringing in method as a more efficient means for measuring line length. As used herein, the term "depthometer" refers to a measuring device used to measure the length of an elongate cable, wire, line or other elongate object (hereafter collectively referred to as a "line"). Conventional depthometers engage the line in some fashion such that the line passes through or alongside the instrument. As the line progresses through the instrument, the line rotates a wheel which in turn increments a registering mechanism that is calibrated to measure the length of the line in close approximation to the actual length passing through the instrument.

One such wheeled depthometer, manufactured by Cavins Company, was designed to replace the stringing in method and has seen widespread use in the oil and gas industry for decades. This depthometer engages the line at the wellhead, then is suspended in position by a tether or held in position with a stand mechanism. In this configuration the line is not translated beyond the relatively small area of the wellhead opening and the depthometer remains relatively fixed in position. The line passes over a wheel of the Cavins depthometer as it is lowered into the well causing the wheel to rotate, which in turn increments a counter that presents a length measurement output to the user.

Over the past few decades there have been significant changes to operating procedures, methods, and standards used by the well industry, in particular the oil and gas industry. To accommodate newer procedures, the line must often be passed through additional mechanisms at the wellhead before being lowered into the well. Also, safety regulations limit physical contact between users and lines lowered into a well, as well as with instruments or mechanisms attached to, or engaged with lines. There has not, however, been a concurrent alteration to the design of depthometers to comply with revised operating and safety procedures.

One difficulty that arises when using depthometers is the obstruction caused by the wellhead lubricator. A lubricator is a section of pipe large enough to contain the tools necessary to perform certain tasks inside of a well bore. Completed wells employ lubricators to contain gas pressure or fluids for safety purposes. Attached to the top of the lubricator is a mechanism commonly referred to as an "oil saver", "pack off", or "blow out preventer," which contains a rubberized seal and can be compressed around the line into the well to contain gases and fluids. While depthometers are used on incomplete wells where gas and fluid containment may not be required, depthometers are most often used on completed wells in conjunction with a lubricator. The lubricator is generally at least twenty feet in height and is placed atop a typical wellhead, which is approximately five feet in height. A depthometer cannot be placed within the lubricator, therefore it must be placed at a height on the line above the wellhead that is beyond the grasp and visibility of the user.

To avoid the obstruction caused by the lubricator, depthometers are sometimes positioned in proximity to the draw-works drum used to take up and release the line. While this position provides the user improved access to the depthometer, the depthometer measurement output is presented to the user upside-down or in another position obstructing the ability of the user to read the output. Further, the depthometer must often be held by hand when positioned at the draw-works drum to obtain a reliable measurement, in violation of safety precautions. Safety precautions dictate that depthometers not be held by hand while in use to prevent the user from coming into contact with the line or other moving parts. Instead, a stand or tether and suspension eye is used to hold the depthometer in position.

To complicate this situation, most depthometers do not securely engage the main measurement wheel to the line. Consequently, movement of the line or a slight pull on the depthometer often disengages the wheel from the line resulting in unreliable measurements. When mounting a depthometer in proximity to the cable drum, placing the depthometer on a stand or securing it by tether is impractical. As the line is released from the drum, it travels left to right as well as transversely as the layers of wound line diminish. This causes the depthometer to constantly change position in relation to the movement of the line. When placed on a stand the depthometer continuously disengages from the cable due to the constant movement of the cable. Further, when the depthometer is tethered in proximity to the drum, the weight of the depthometer tends to pull the main wheel away from the line thereby disengaging the instrument from the line.

Other difficulties with conventional depthometers include open spokes on main measuring wheels which can injure fingers if placed too close in proximity; awkward installation procedures of the depthometer upon the line; damage to the counter due to accumulated debris in open gear components; and broken or damaged idler arms that hold idler wheels due to fatigue and misalignment.

What is needed is an improved depthometer that securely engages a line and provides accurate measurements, is easily and efficiently installed and uninstalled from the line, and accommodates improved safety measures.

SUMMARY OF THE INVENTION DISCLOSURE OF THE INVENTION

The depthometer measures a length of an elongate line. The depthometer includes a main body component and a lower body component. A main wheel is mounted upon the main body component and one or more line guides are mounted upon the lower body component. The main wheel is in communication with a registering mechanism for providing a measurement output reflecting a length of the line. Means are provided for automatically moving the main body component towards the lower body component to engage the line.

Objects, advantages and novel features, and further scope of applicability of the depthometer will be set forth in part in the detailed description to follow, taken in conjunction with the accompanying drawings, and in part will become apparent to those skilled in the art upon examination of the following, or may be learned by practice of the depthometer invention. The objects and advantages of the depthometer may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate a preferred embodiment of the depthometer and, together with the description, serve to explain the principles of the depthometer. The drawings are not to be construed as limiting the depthometer.

DESCRIPTION OF THE PREFERRED EMBODIMENTS (BEST MODES FOR CARRYING OUT THE INVENTION)

Figure 1:
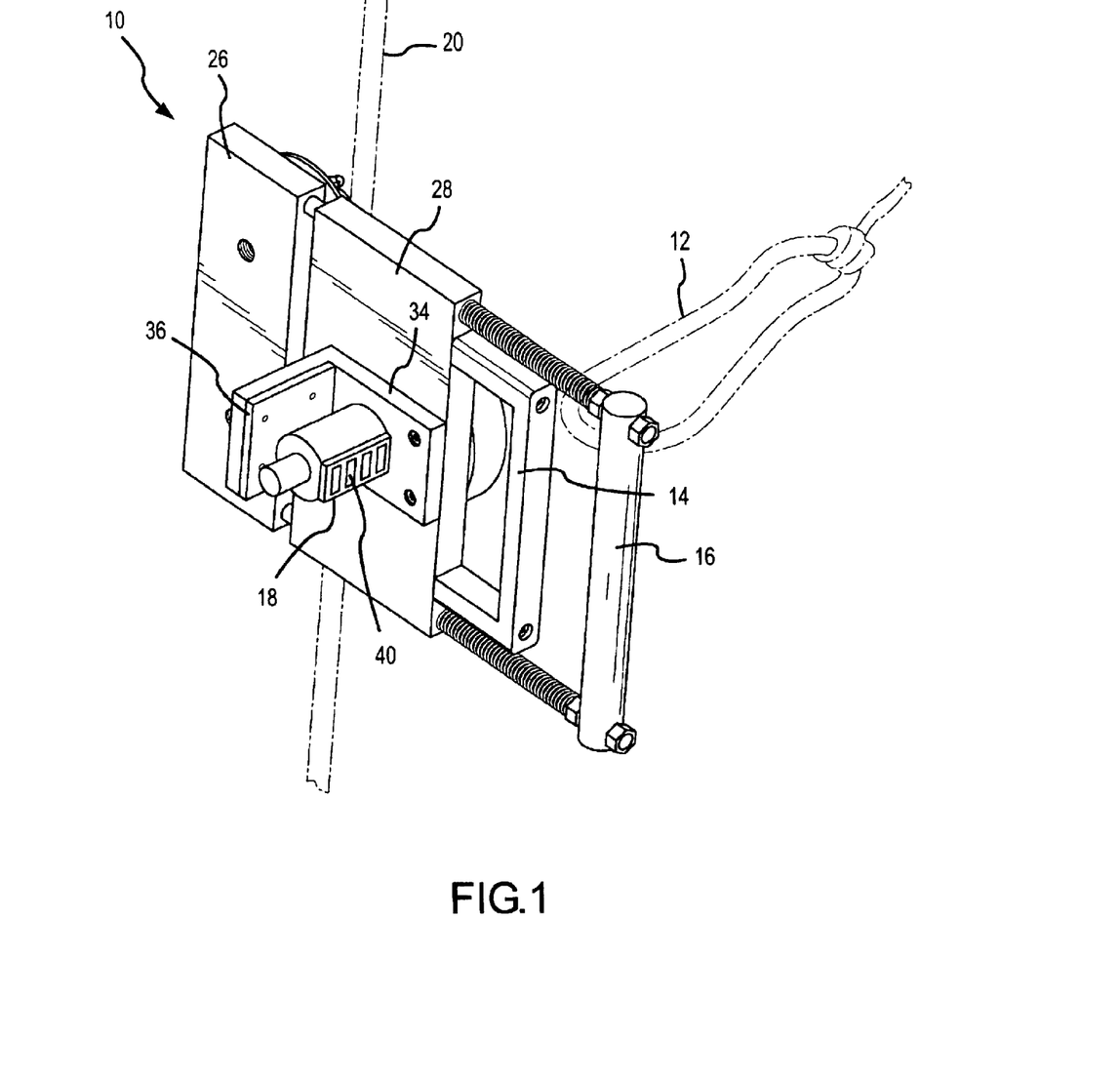
FIG. 1 is a perspective front view of the depthometer installed upon an elongate line for measuring a length of the line.
Figure 2:
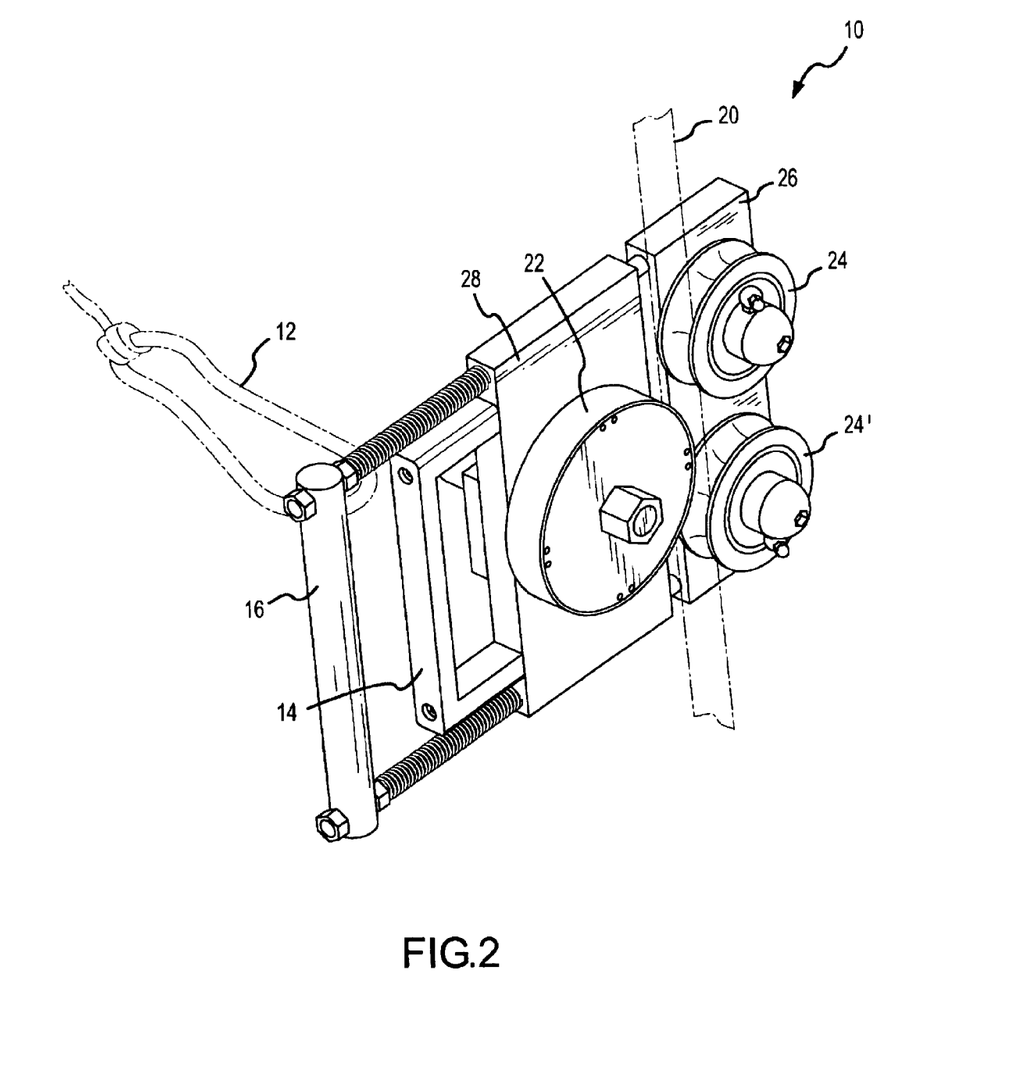
FIG. 2 is a perspective rear view of the depthometer installed upon a line.
Figure 3A:
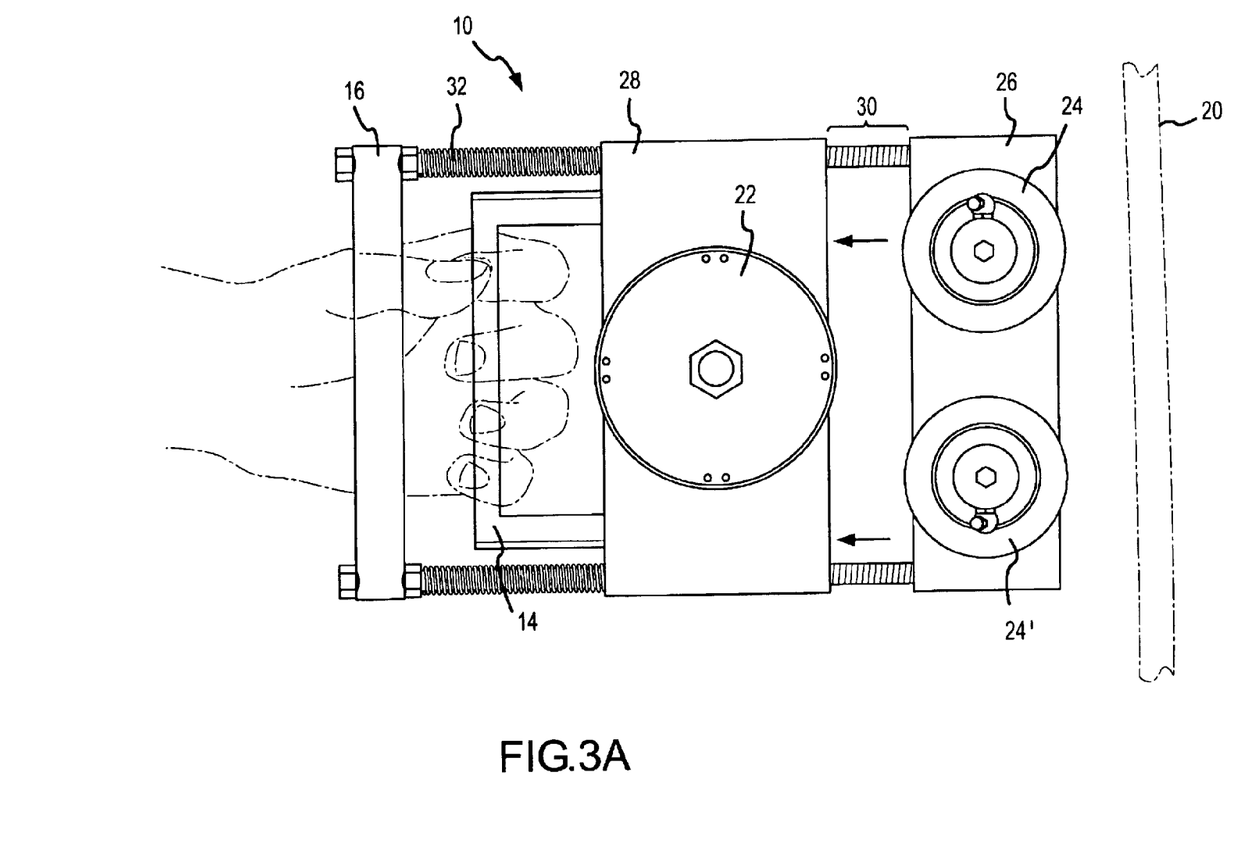
FIG. 3a is a rear view of the depthometer showing a user grasping and squeezing the inner and outer handles together to open the depthometer.
Figure 3B:
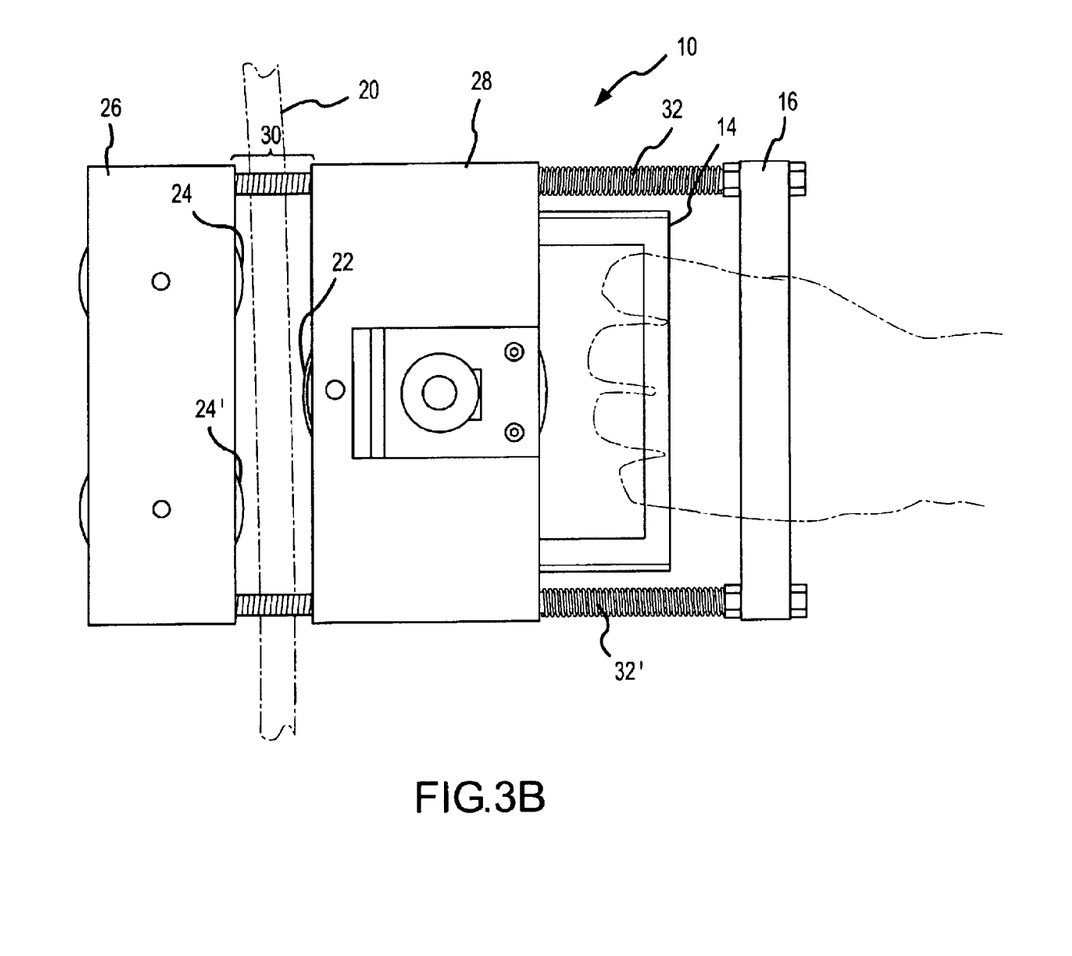
FIG. 3b is a front view of the depthometer in the open position showing a user positioning a line into the depthometer.
Figure 3C:
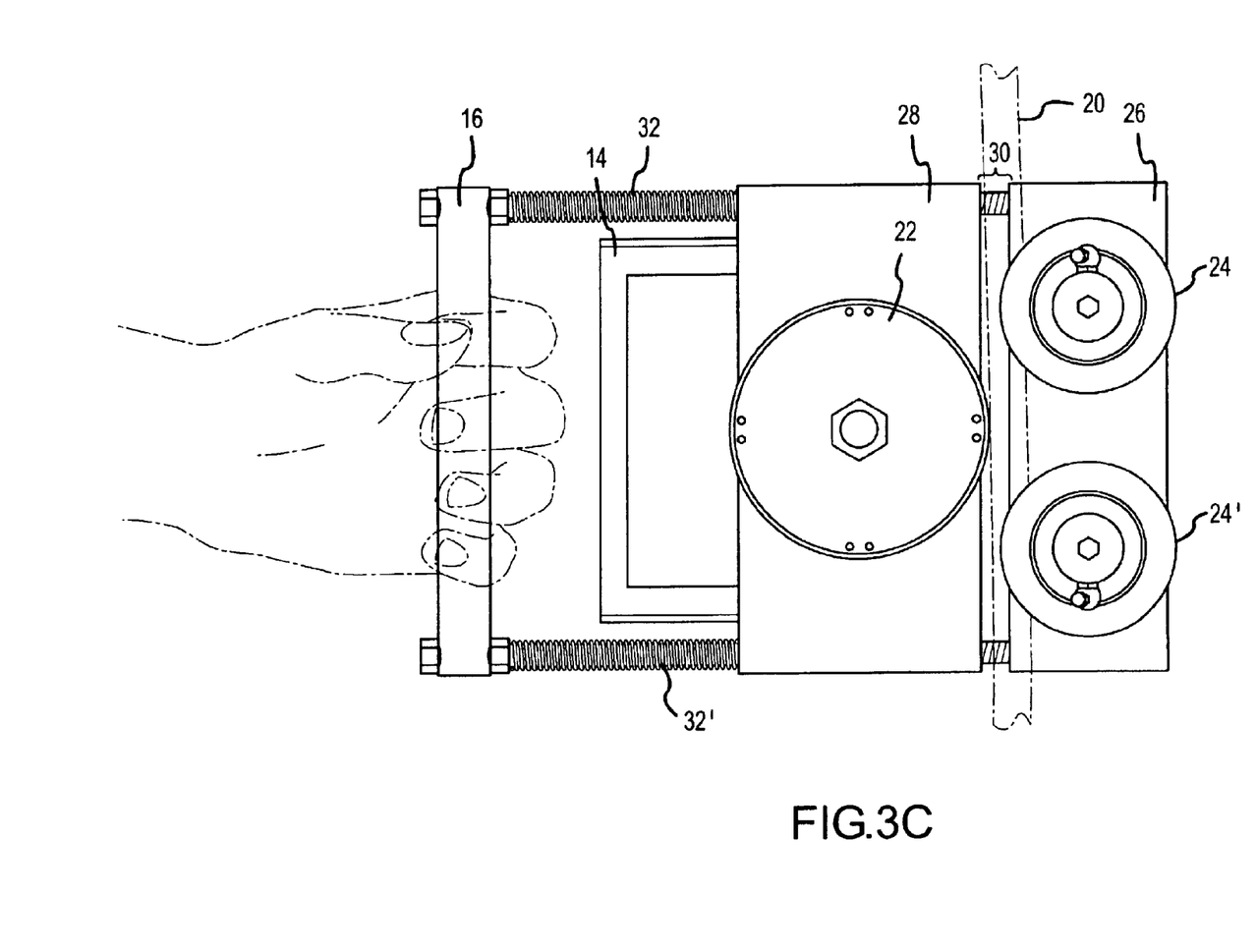
FIG. 3c is a rear view of the depthometer showing a user releasing the inner handle from the outer handle to close the depthometer and engage a line.

FIGS. 1, 2 and 3 provide an overview of the operation of depthometer 10 used for measuring a length of an elongate line. Referring to FIG. 1, a perspective front view of depthometer 10 installed upon an elongate line 20 for measuring a length of line 20 is shown. Depthometer 10 engages line 20 in a secure manner when in the installed position.

First, or inner, handle 14 is used in conjunction with second, or outer, handle 16 to open and close two adjacent and opposing body components, 26 and 28, of the body of depthometer 10 that serve as means for mounting line guides and a wheel. Inner handle 14 and outer handle 16 additionally provide a means for grasping the depthometer 10. When a user grasps inner handle 14 and outer handle 16 and squeezes inner handle 14 towards outer handle 16, first, or main, body component 28 of depthometer 10 is displaced from second, or lower, body component 26. This displacement produces a gap between the body components, wherein a user positions a line 20 between a wheel and line guides of depthometer 10 that are mounted upon main and lower body components respectively. (See also FIG. 2.)

Releasing inner handle 14 allows a spring-like force to automatically move main body component 28 towards lower body component 26, thereby reducing the gap between the components, and engaging line 20 between wheel and line guides of depthometer 10 in the installed position. As used herein the term "spring-like" force means a force created by a spring or by any other mechanism that automatically provides a force when released from being restrained in a position in opposition to an at-rest position. Although a spring is depicted in the figures, other mechanisms can be used in the alternative to create this force. Means for producing a spring-like force include but are not limited to springs, hydraulic devices, and air-driven devices. Therefore, means for automatically moving main body component 28 towards lower body component 26 include but are not limited to springs, hydraulic devices, and air-driven devices.

Once line 20 is installed in depthometer 10 and passes through depthometer 10, registering mechanism 18 presents a length measurement visible to a user on display 40. Tether 12 is optionally connected to outer handle 16 and provides additional security to depthometer 10 when installed on line 20.

Referring to FIG. 2, a perspective rear view of depthometer 10 installed upon an elongate line 20 for measuring a length of line 20 is shown. Main wheel 22 is rotatably connected to main body component 28 and is rotated by frictional contact with line 20 as line 20 passes through depthometer 10 when in the installed position and engaged by the depthometer. As line 20 passes through depthometer 10 it moves tangentially along main wheel 22. Main wheel 22 in turn increments registering mechanism 18 (FIG. 1) to provide a measurement output. Line guides 24, 24' connected to lower body component 26 guide line 20 through depthometer 10 and provide an opposing force to that of main wheel 22 against line 20 to stabilize the installed line 20 in a secure engaged position and to maintain frictional contact between line 20 and main wheel 22 when pressed towards main wheel 22 by a spring-like force.

Line guides 24, 24' include various mechanisms for guiding a line including but not limited to idler wheels 24, 24' rotatably connected to lower body component 26. Alternatively, line guides 24, 24' comprise non-rotating mechanisms connected to lower body component 26, having grooves within which line 20 slides when passing through depthometer 10. It will be understood that while two line guides are depicted in the figures, a single line guide could achieve the identical function, way and result.

Preferably, the outer circumferential ring of main wheel 22 upon which line 20 travels is a sufficiently durable material, such as, but not limited to steel. If the circumference of main wheel 22 is not a sufficiently durable material, the line tends to wear down the surface, resulting in a smaller effective diameter of main wheel 22 and inaccurate length measurement.

Examination of FIGS. 1, 2 and 3 reveals the effective and simple manner of securely installing depthometer 10 upon a line, which eliminates the need for holding the depthometer by hand, by a stand, or by any other mechanism while taking a measurement. FIGS. 3a, 3b and 3c show the methodology of installing depthometer 10 upon line 20. Referring to FIG. 3a, a rear view of depthometer 10 is shown. A user grasps inner handle 14 and outer handle 16 and squeezes inner handle 14 towards outer handle 16 to open depthometer 10. This squeezing action is in opposition to the force of spring 32 against main body component 28 caused by the tendency of the spring to return to its natural resting position. Inner handle 14 is connected to main body component 28. Outer handle 16 connects to and slidably engages main body component 28 and is connected to lower body component 26. The action of squeezing inner handle 14 towards outer handle 16 pulls main body component 28 away from lower body component 26 leaving a gap 30 between component 26 and component 28 and separating main wheel 22 from opposing idler wheels 24, 24'.

Turning to FIG. 3b, a front view of depthometer 10 is shown in the open position. While squeezing inner handle 14 towards outer handle 16 to maintain gap 30, a user positions line 20 substantially parallel to gap 30 such that line 20 is placed adjacent main wheel 22, between main wheel 22 and opposing idler wheels 24 and 24'. As shown in FIG. 3c, a rear view, release of inner handle 14 allows the force of spring 32, returning to a resting position, to automatically move main body component 28 towards lower body component 26, reducing the width of gap 30 to an extent that engages line 20 in a substantially tangential manner between opposing main wheel 22 and idler wheels 24, 24'.

Although spring 32 can comprise different materials, types, and sizes, spring 32 should provide enough force against main body component 28 to aid in securing line 20 between main wheel 22 and idler wheels 24, 24'. A compression spring is desirable as it fatigues less readily than an expansion spring. While between approximately ten and fifteen pounds of force to squeeze inner handle 14 towards outer handle 16 is typically appropriate, the amount of spring force necessary to secure line 20 between the wheels is related to the diameter of the line.

Figure 4:
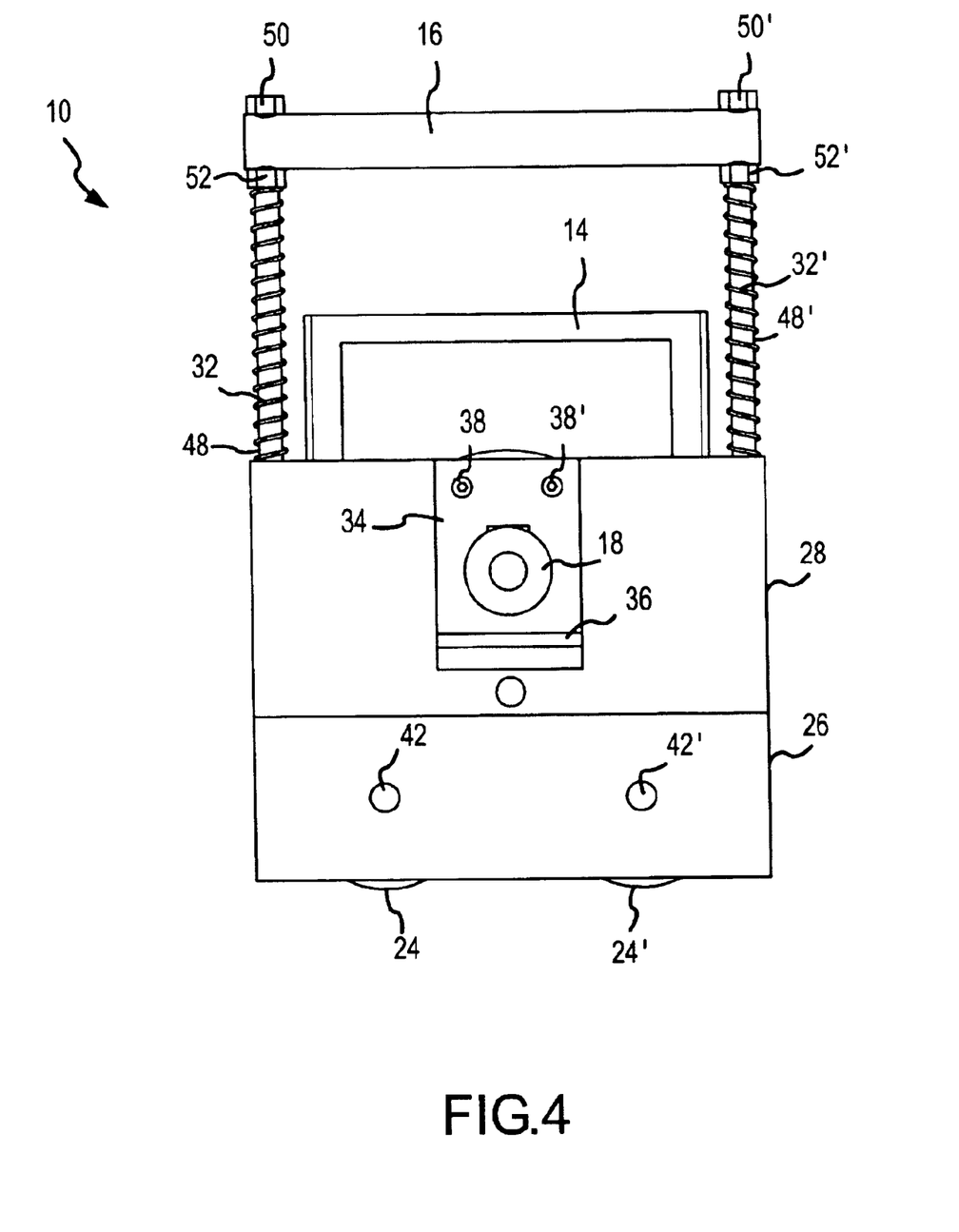
FIG. 4 is a close up front view of the depthometer.

Referring to FIG. 4, a front view of depthometer 10 is shown. Registering mechanism 18 has a rotary counter and is available and known in the art; therefore, the inner workings and configuration of registering mechanisms are not described here. One example of such a registering mechanism is manufactured by Redding, Inc. Registering mechanism 18 is mounted upon bracket 34 that is mounted to main body component 28. Bracket 34 is affixed to main body component 28 by connecting means 38 such as, but not limited to, bolts and nuts, welding, rivets, other connecting means, or combination thereof. Bracket 34 includes a planar portion that is adjacent and parallel to the plane defined by main body component 28 and a ledge portion 36 that extends orthogonally outward from the plane defined by main body component 28.

Registering mechanism 18 is in communication with main wheel 22, having a shaft passing through bracket 34 and main body component 28 as described with reference to FIG. 6. Rotation of main wheel 22 increments registering mechanism 18 which provides a measurement output visible to a user on display 40. For example, a single revolution of main wheel 22 could increment registering mechanism 18 to indicate passage of a one-foot length of line through depthometer 10. As is known, the radius of main wheel 22 and the internal configuration of registering mechanism 18 affect the measurement output of depthometer 10. Thus the radius of main wheel 22 and the type of registering mechanism 18 must correspond to produce an accurate or nearly accurate measurement output as will be apparent to those of skill in the art. It will be apparent to those of skill in the art that registering mechanism 18 provides either a mechanical output, electrical output such as a digital output on a light emitting diode (LED) display or other display, or any combination thereof to indicate a measurement on display 40. With continuing reference to FIG. 4, idler wheels 24, 24' (FIGS. 3a, 3b and 3c) are rotatably connected to lower body component 26 at points 42, 42'.

Figure 5:
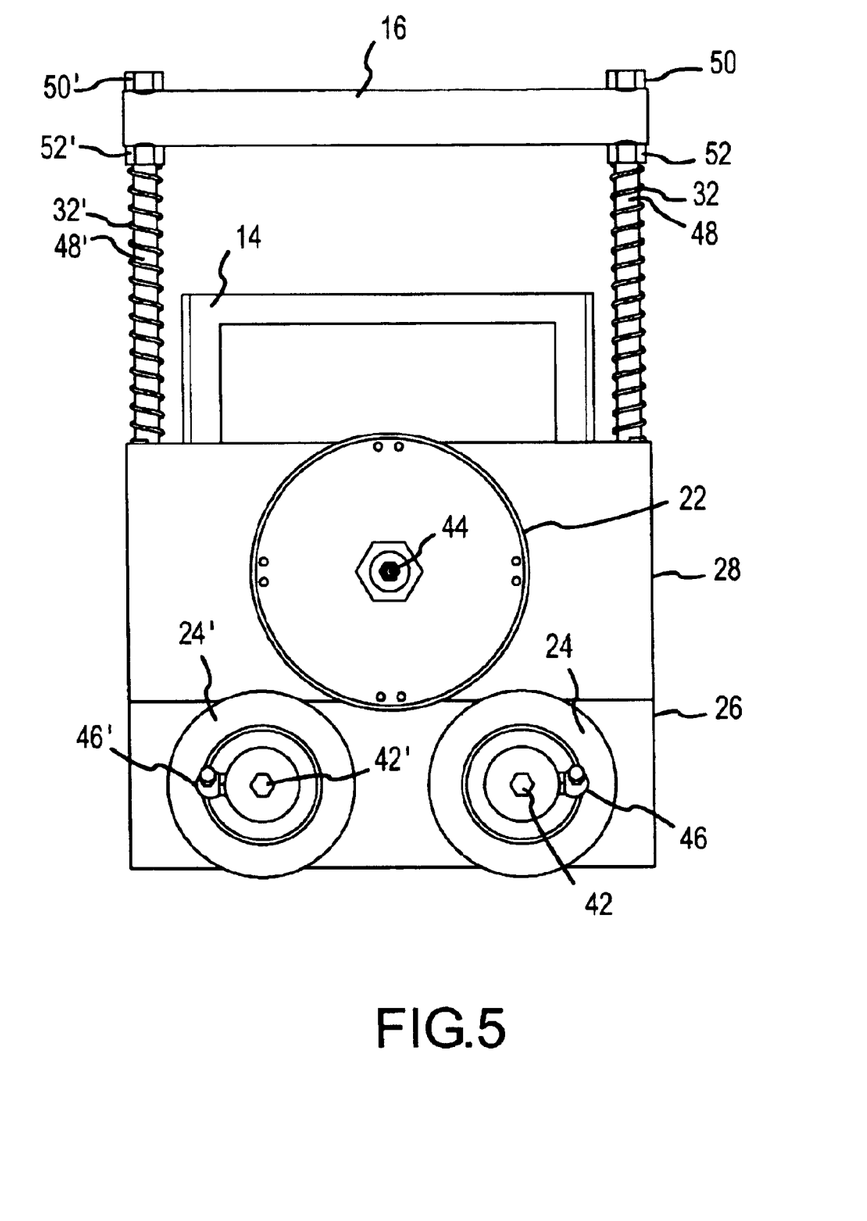
FIG. 5 is a close up rear view of the depthometer.

Referring to FIG. 5, a rear view of depthometer 10 is shown. Idler wheels 24, 24' are shown rotatably connected to lower body component 26 at points 42, 42'. Idler wheels 24, 24' are lubricated through lubrication mechanisms 46, 46', such as grease zerks. Main wheel 22 is rotatably connected to main body component 28 at 44.

Inner handle 14 is connected to main body component 28 such that a user can grasp inner handle 14 and pull main body component 28 away from lower body component 26 and towards outer handle 16. Outer handle 16 slidably engages main body component 28 and is connected to lower body component 26. (See also FIG. 7.) Outer handle 16 consists of shafts 48, 48' and a transverse portion 54 that is grasped by hand. Transverse portion 54 of handle 16 is connected at opposing ends to shafts 48, 48' that extend perpendicularly from opposing ends of portion 54. Transverse portion 54 is connected to shafts 48, 48' by any appropriate means such as, but not limited to, threadedly inserting shaft 48 through a mating opening, or bore, defined in transverse portion 54 and further securing the two components together by appropriate connecting means such as but not limited to nuts secured on mating threads of shaft 48. Alternatively, transverse portion 54 is welded to shaft 48 or connected by connecting means such as rivets. It will be appreciated by those of skill in the art that handle 16 can of course be comprised of a single, integral U-shaped unit that provides both the transverse portion 54 and shafts 48, 48'.

Inner handle 14 is depicted in the figures as a U-shaped component. In an alternative embodiment, inner handle 14 comprises a T-shaped component consisting of a transverse bar connected to a single shaft portion that is connected to main body component 28, instead of a transverse bar connected to two shaft portions connected to the main body component 28 as shown in the figures.

As shown in FIG. 5, stopping mechanisms 50, 52 such as but not limited to nuts threaded onto shaft 48 via mating threads on shaft 48 on opposing sides of an end of transverse portion 54, secure portion 54 of handle 16 in a stable position at a point along the length of shaft 48. Stopping mechanism 52 additionally provides a stop to the far end of spring 32 inserted over shaft 48. It will be apparent to those of skill in the art that stopping mechanisms 50, 52 are optional particularly when transverse portion 54 of handle 16 is connected to shafts 48, 48' in permanent fashion, for example by welding portion 54 to shaft 48. Spring 32 is compressible and expandable along shaft 48 between main body component 28 and transverse portion 54 of handle 16. Stopping mechanism 50 is preferably fixed permanently to shaft 48, such as by welding, so that rotation of mechanism 50 results in simultaneous rotation of shaft 48. This is particularly useful for adjusting the tension of spring 32 should spring 32 become fatigued from wear.

Figure 6:
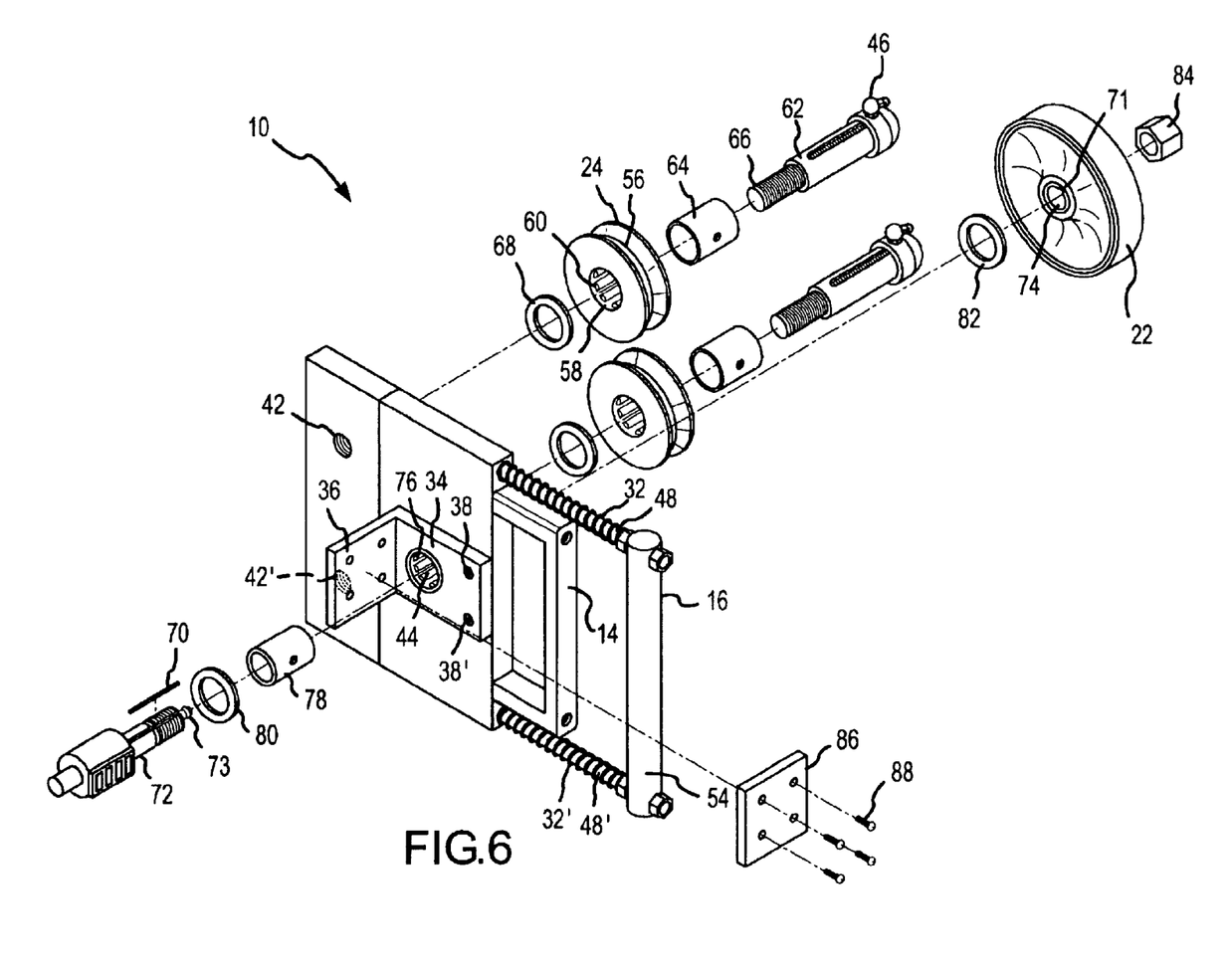
FIG. 6 is an exploded perspective view of the depthometer.

FIG. 6 provides an exploded view of depthometer 10. A groove 56 is defined around the circumference of each idler wheel 24 to provide a recessed area for a line to rest within and be held stable while passing through the depthometer. Each idler wheel 24 defines an opening 58 through which an axis for rotation of the wheel securely fits. Within opening 58 is a series of bearings 60. Wheel axis 62 passes through sleeve 64 within opening 58. Lubricant is provided to idler wheel 24 through lubrication mechanism 46. Threaded end 66 of axis 62 is passed through mating opening, or bore, 42 of lower body component 26 with washer 68 against lower body component 26 to secure axis 62 in position on lower body component 26. Preferably, threaded end 66 extends through opening 42 to an extent that the bottom surface of threaded end 66 is flush with the plane of the lower body component 26 on the side opposite the side from the idler wheel 24.

Means for registering a length of an elongate line are provided by registering mechanism 18. Main wheel 22 is in communication with registering mechanism shaft 72. Registering mechanism shaft 72 passes through mating openings, or bores, 44 defined in bracket 34 and main body component 28 respectively. A series of bearings 76 are provided within opening 44. Registering mechanism shaft 72 passes through sleeve 78 that is inserted within opening 44. Washer 80 is inserted over shaft 72 between main body component 28 and registering mechanism. Registering mechanism 72 defines a threaded opening longitudinally through its entire length, and lubrication mechanism, or grease zerk, 73 threaded into shaft 72 provides a means for lubricating bearings 76.

Registering mechanism 18 is preferably removable from bracket 34 to permit installation of a replacement registering mechanism in the event that registering mechanism parts become worn. A first end of registering mechanism shaft 72 is in communication with registering mechanism 18 which contains display 40 (FIG. 1). Connection means, such as but not limited to, a set screw, inserted through the mating opening of registering mechanism 18 and into shaft 72, attaches registering mechanism 18 to shaft 72. The opposite end of shaft 72 and associated key stock 70, which is passed through openings 44 defined in bracket 34 and main body component 28, continues through opening 74 defined in main wheel 22 with washer 82 between main body component 28 and main wheel 22. Nut 84 is secured on the end of shaft 72 on the side of main wheel 22 furthest from main body component 28. Key stock 70 is fixed in mating slot 71 of opening 74 defined in main wheel 22, thus rotation of main wheel 22 rotates registering mechanism shaft 72, which in turn increments the measurement output upon display 40. A plate 86 is connected between registering mechanism 18 and ledge portion 36 of bracket 34 with connecting means 88 such as but not limited to screws, rivets, or nuts and bolts to connect registering mechanism 18 to bracket 34.

Figure 7:
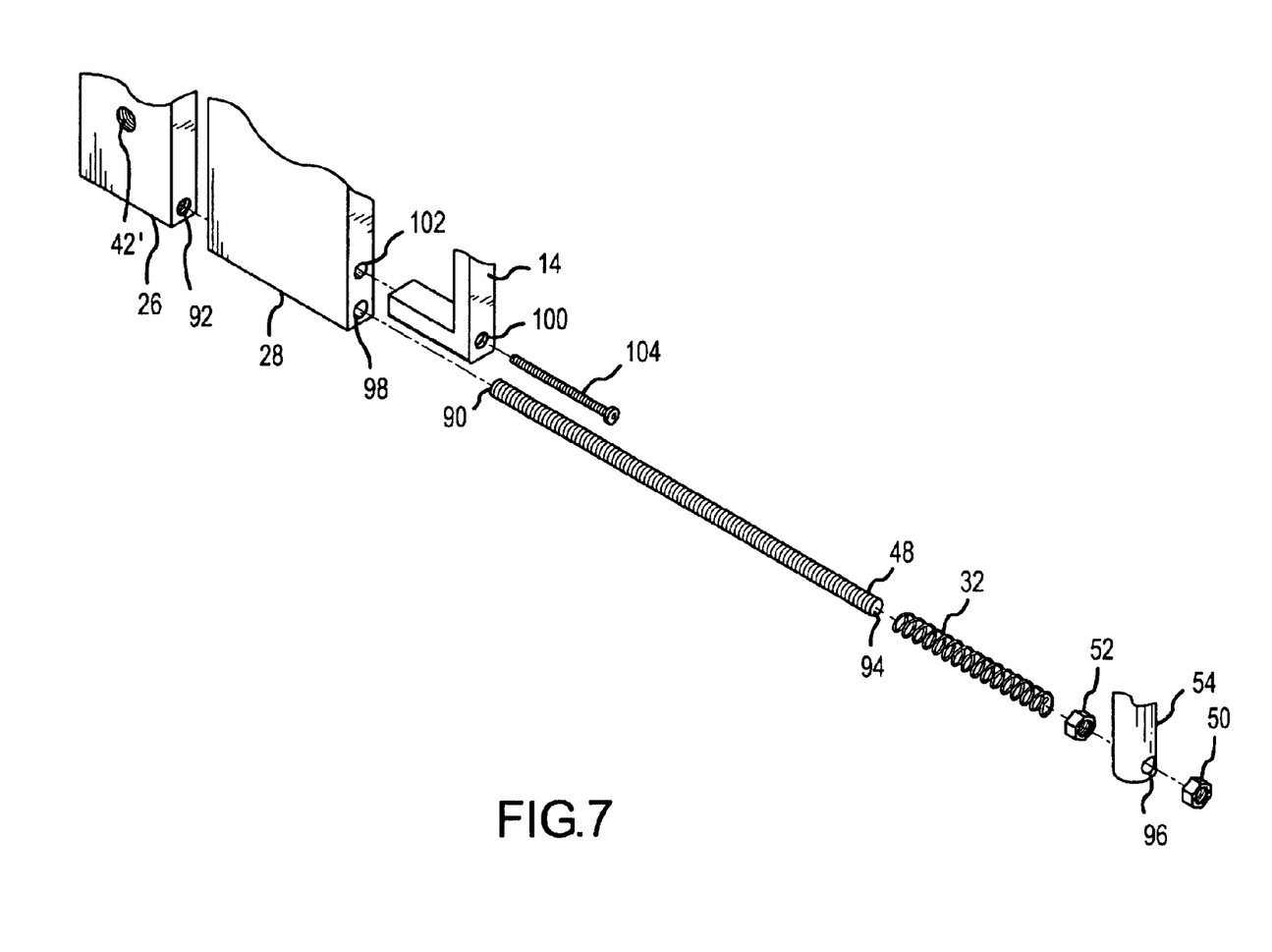
FIG. 7 is an exploded perspective view of a portion of the main and lower body components, and inner and outer handles of the depthometer.

Referring to FIG. 7, an exploded view of a portion of the lower body component 26, main body component 28, inner handle 14, and outer handle 16 is shown. Each shaft 48 of handle 16 is securely connected at opposing ends to lower body component 26 and transverse portion 54 of handle 16, respectively. One way to secure shaft 48 to lower body component 26 and transverse portion 54 is by providing threads upon shaft 48 at opposing ends and providing mating openings for receiving the threaded ends of shaft 48 within lower body component 26 and transverse portion 54 of handle 16. It will of course be apparent to those of skill in the art that shaft 48 can be connected to lower body component 26 and to transverse portion 54 by other means, such as by welding.

However, as shown in FIG. 7, threaded end 90 of shaft 48 is threadedly inserted into mating opening 92 defined in lower body component 26 to a depth sufficient to securely fix shaft 48 to lower body component 26. The central portion of shaft 48 extends through bore 98 defined in main body component 28. Bore 98 is smooth and of slightly larger diameter than that of shaft 48 such that main body component 28 can slide along the length of shaft 48 without being obstructed by the threads upon shaft 48. It will of course be apparent that shaft 48 need not be threaded on its entire length but instead be smooth for that length upon which main body component 28 slidably engages. In that instance, bore 98 need only be of a diameter sufficient to contain the diameter of shaft 48.

Threaded end 94 is inserted through mating opening 96 defined in transverse portion 54 of handle 16. Stopping mechanisms 50 and 52 secure shaft 48 and transverse portion 54 of handle 16 at the point where they join.

Inner handle 14 is securely connected to main body component 28. Mating openings 100, 102, defined in handle 14 and main body component 28 respectively, receive bolt 104 to join inner handle 14 and main body component 28 together in a permanent manner. Alternatively, as will be apparent, handle 14 and main body component 28 are joined by other connecting means such as but not limited to welding. Or, handle 14 and main body component 28 can together form a single integral unit, formed by a single mold.

Spring 32 is positioned longitudinally over shaft 48 between transverse portion 54 of handle 16 and the upper surface of main body component 28. Main body component 28 is pressed towards lower body component 26 by the expansion force of spring 32. Squeezing inner handle 14 toward outer handle 16 compresses spring 32. The release of inner handle 14 allows the compressed spring 32 to expand. The expansion force of spring 32 automatically presses main body component 28 towards lower body component 26, thereby engaging the line.

It will be understood by those of skill in the art that the components of depthometer 10 can be of a variety of shapes, sizes, dimensions, and materials. The depthometer is not to be limited to the shapes, sizes, and dimensions depicted in the figures.

Although the depthometer has been described in detail with reference to these preferred embodiments, other embodiments can achieve the same results. Variations and modifications of the present depthometer will be obvious to those skilled in the art and it is intended to cover in the appended claims all such modifications and equivalents.

What is claimed is:

1. A depthometer for measuring a length of an elongate line, said depthometer comprising:
    a main body component;
    a main wheel connected to said main body component;
    a registering mechanism in communication with said main wheel;
    a lower body component; and
    a handle for displacing said main body component from said lower body component, comprising an inner handle connected to said main body component and an outer handle connected to said lower body component; and
    means for automatically moving said main body component towards said lower body component to engage a line.

2. The depthometer of claim 1 wherein said means for automatically moving said main body component towards said lower body component to engage a line comprises at least one device selected from the group consisting of springs, hydraulic devices, and air-driven devices.

3. The depthometer of claim 1 further comprising a line guide connected to said lower body component.

4. The depthometer of claim 3 wherein said line guide comprises a wheel.

5. A method of measuring a length of an elongate line, the method comprising the steps of:
    providing a depthometer having a registering mechanism;
    displacing a first body component from a second body component by squeezing a first handle toward a second handle;
    positioning a line adjacent a wheel; and
    automatically moving the first body component towards the second body component to engage the line.

6. The method of claim 5 wherein the step of displacing a first body component from a second body component comprises compressing a spring.

7. The method of claim 5 wherein the step of positioning a line adjacent a wheel comprises positioning a line between a wheel mounted upon the first body component and a line guide mounted upon the second body component.

8. The method of claim 5 wherein the step of automatically moving the first body component towards the second body component to engage the line comprises forcing the first body component towards the second body component with a spring-like force to engage the line.

9. The method of claim 8 wherein the step of forcing the first body component towards the second body component with a spring-like force to engage the line comprises allowing a compressed spring to expand.

10. A depthometer for measuring a length of an elongate line, said depthometer comprising:

a wheel for contacting an elongate line;

means for creating a spring-like force against the line to maintain frictional contact between the line and said wheel;

means for registering a length, an inner handle; and an outer handle, said inner and outer handles oriented upon the depthometer to create a force in opposition to said spring-like force when one of said handles is displaced toward the other.

11. The depthometer of claim 10 wherein said means for creating a spring-like force comprises a spring.

12. The depthometer of claim 10 further comprising means for mounting said wheel.

13. The depthometer of claim 12 wherein said means for mounting said wheel comprises a main body component.

14. The depthometer of claim 13 further comprising a line guide.

15. The depthometer of claim 14 further comprising a lower body component, said line guide mounted upon said lower body component.

16. The depthometer of claim 15 wherein said means for creating a spring-like force is positioned on the depthometer to move said main body component towards said lower body component.

17. The depthometer of claim 13 wherein said outer handle slidably engages said main body component.

18. The depthometer of claim 15 wherein said outer handle connects to said lower body component.

19. The depthometer of claim 13 wherein said inner handle connects to said main body component.

20. The depthometer of claim 15 wherein said outer handle comprises:

at least one shaft connected to said lower body component; and a transverse portion connected to said at least one shaft.

21. The depthometer of claim 20 wherein said means for creating a spring-like force comprises a spring inserted over said shaft of said outer handle.

* * * * *